No. 856,957. PATENTED JUNE 11, 1907.
A. R. HUBBARD.
SPRING TIRE FOR WHEELS.
APPLICATION FILED JULY 2, 1906.

3 SHEETS—SHEET 1.

Witnesses
Geo. L. Cary.
Myron H. Clear

Inventor
A. R. HUBBARD
By Wilkinson & Fisher
his Attorneys

No. 856,957. PATENTED JUNE 11, 1907.
A. R. HUBBARD.
SPRING TIRE FOR WHEELS.
APPLICATION FILED JULY 2, 1906.
3 SHEETS—SHEET 2.
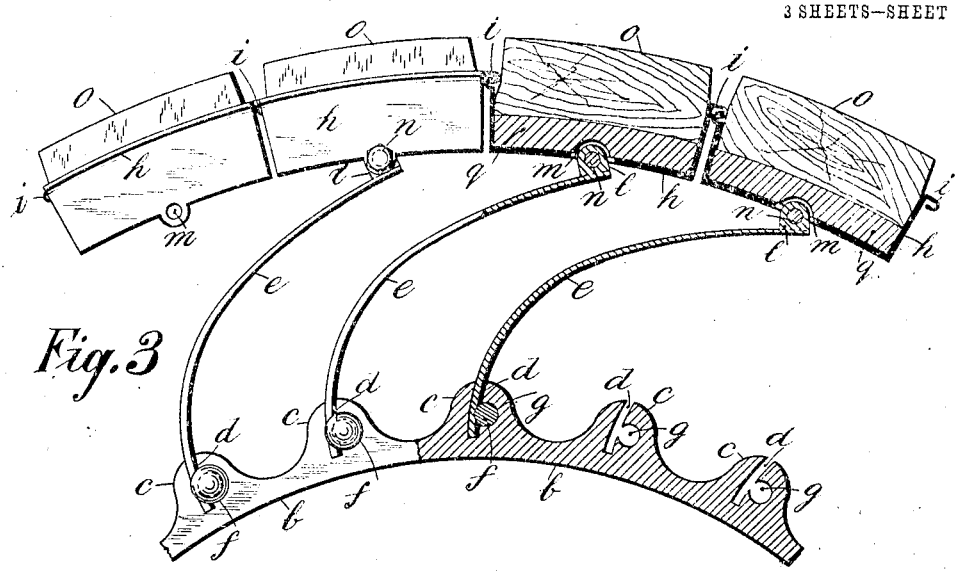
Fig. 3
Fig. 4
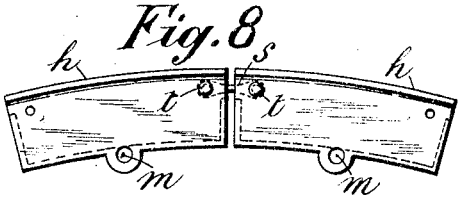
Fig. 5
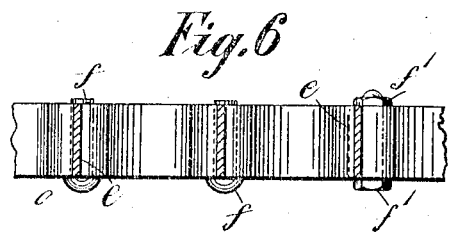
Fig. 6
Fig. 8
Fig. 7
Witnesses
Geo. L. Cary
Myron H. Clear
Inventor
A. R. Hubbard
by Wilkinson & Fisher
his Attorneys No. 856,957. PATENTED JUNE 11, 1907.
A. R. HUBBARD.
SPRING TIRE FOR WHEELS.
APPLICATION FILED JULY 2, 1906.
3 SHEETS—SHEET 3.
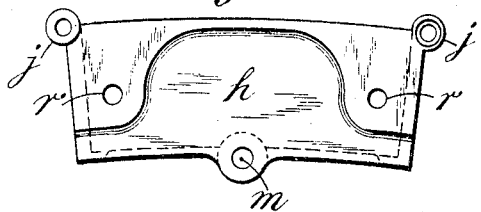
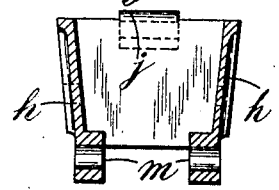
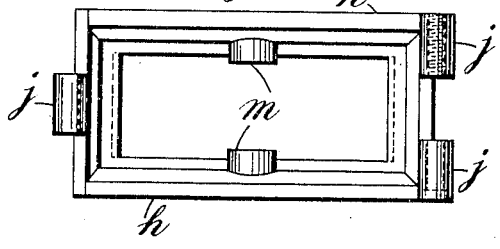
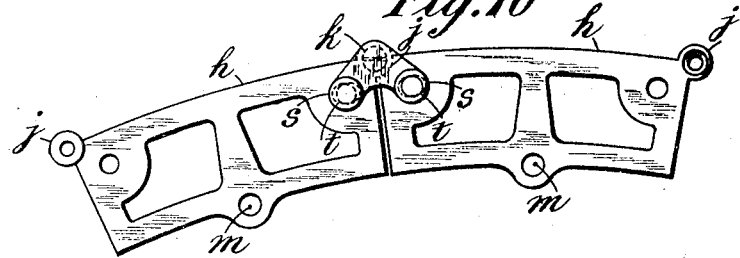
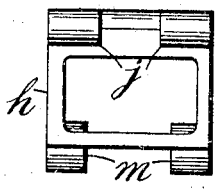
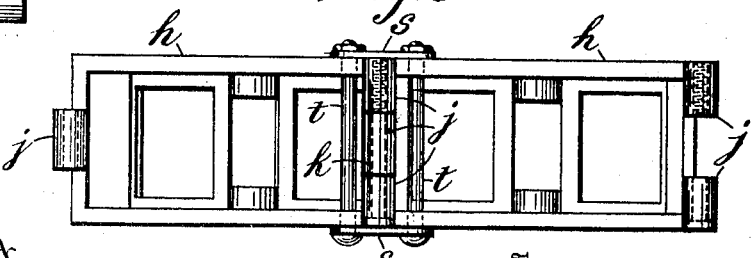
Witnesses
Geo. L. Gary
Myron G. Clear
Inventor
A. R. HUBBARD
By Wilkinson & Fisher
his Attorneys

UNITED STATES PATENT OFFICE.

ARTHUR ROBERT HUBBARD, OF LONDON, ENGLAND.

SPRING-TIRE FOR WHEELS.

No. 856,957.　　　Specification of Letters Patent.　　　Patented June 11, 1907.

Application filed July 2, 1906. Serial No. 324,458.

*To all whom it may concern:*

Be it known that I, ARTHUR ROBERT HUBBARD, a subject of the King of Great Britain, of 37 Upper Thames street, London, in the county of Middlesex, England, have invented new and useful Improvements in Spring-Tires for Wheels, of which the following is a specification.

This invention relates to the tires of wheels, and more especially to the wheels of motor cars, cycles, or wheels of carts, carriages, or other vehicles.

It has been usual in such wheels to use (for the purpose of obtaining the requisite elasticity), india rubber tires to the wheels, either solid or supported by pneumatic tubes containing compressed air, but by my present invention I do not obtain the required elasticity by means of india rubber, but by means of metal springs suitably arranged.

The accompanying drawings are in illustration of my invention.

Figure 1:
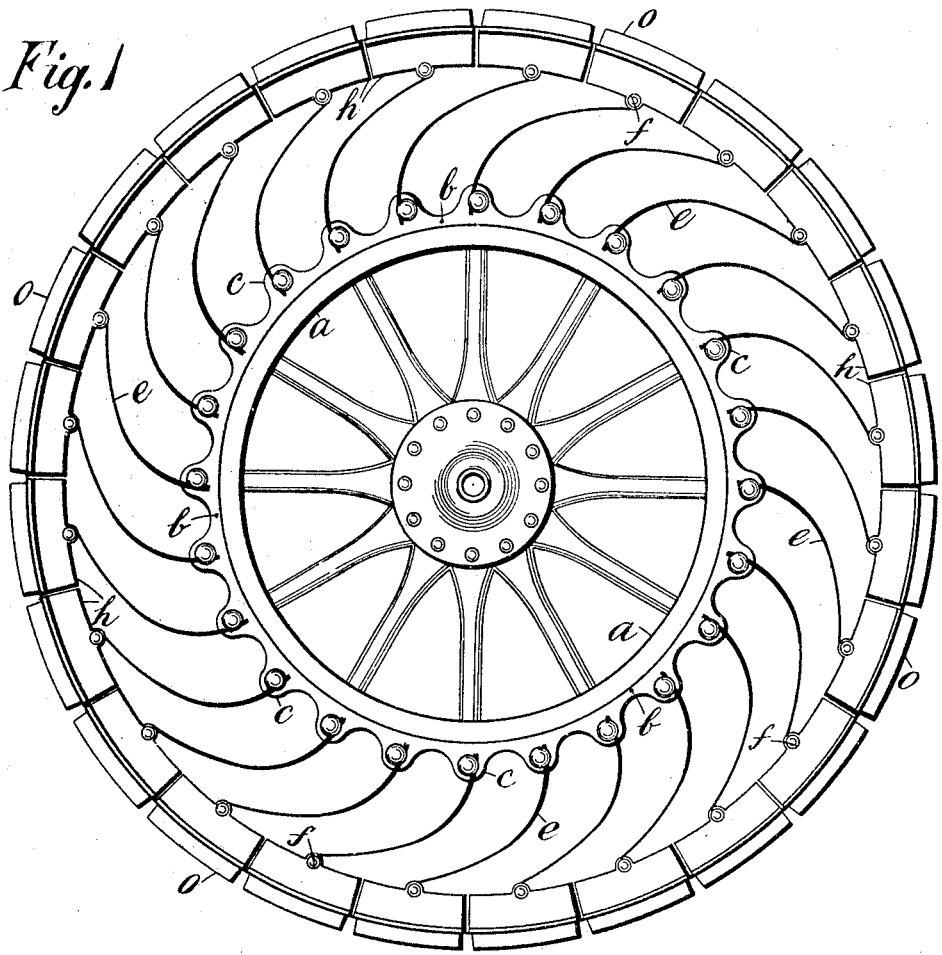
Figure 2:
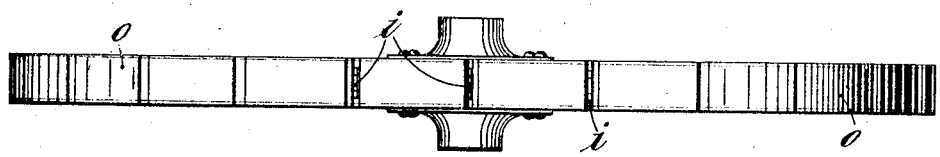

Figure 1 is a side view, and Fig. 2 an end view of an entire wheel. Fig. 3 is a side view, partly in section, upon a larger scale, of part of a wheel. Fig. 4 is a cross section through one of the wooden blocks forming the tread of the wheel, and its metal holder. Fig. 5 is a plan from below of one of the metal block holders. Fig. 6 is a section through some of the curved springs showing the method of holding their inner end. Fig. 7 is an end view, and Fig. 8 a side view, showing a method of hinging the metal block-holders together. Fig. 9 is a plan (on a still larger scale), and Fig. 10 a side view, and Fig. 11 an end view, of two of the metal block-holders, showing a method of hinging them together. Fig. 12 is a side view, Fig. 13 a plan, and Fig. 14 a transverse section of a slightly modified form of a metal block-holder.

The same letters of reference indicate similar parts in the several figures.

Assuming the wheel (for a motor car for example) to consist of a hub, spokes, and a wooden rim, of any of the usual kinds, I shrink or otherwise fix round the outer rim $a$ (Fig. 1) a light but sufficiently strong hoop $b$ of iron or steel, preferably of the same width as the wooden rim, but of only the thickness required to provide the necessary strength. Completely round the outer circumference of this metal hoop I form a sufficient number of strong lugs or projections $c$ at a determined distance apart, and extending nearly radially for a sufficient height from the metal hoop. These projections extend preferably completely across the hoop upon which they are formed, and each of them is provided with an inclined groove $d$ (Fig. 3) of sufficient width extending completely through the lug $c$ from side to side, the inner edge of the groove extending as far as the outer circumference of the hoop $b$. Into these grooves I fit tightly the inner or thicker end of elastic steel plates or springs $e$, the outer or thinner ends of which are attached to an outer tire in the manner hereinafter described.

The springs $e$, and the recesses $d$ in which their inner ends are held are not radial, but are curved more or less cycloidally so that their outer or thinner ends become more or less tangential to the outer tire to which they are attached, their outer ends (looked at edgewise), extending circumferentially somewhat beyond the position of the next succeeding lug on the hoop, and so on completely round the wheel. (Instead of being thicker at their inner ends, the springs $e$ may be of uniform thickness throughout.)

I prefer to fix the larger or thicker end of the plate spring $e$ in its recess $d$, by means of a strong cylindrical pin $f$ driven into a hole $g$ bored completely through the lug from side to side, the plate $e$ having a corresponding notch made across it in the proper position, (see Fig. 3) so that the pin is contained principally in the lug, with but a small part of its circumference in the face of the spring, which is therefore held perfectly firmly in its place. Or the pin $f$ may press directly against the face of the spring plate $e$ (the notch in which is omitted), and a nut may be screwed upon one end of the pin, to retain it in its place, a thin head being provided at its other end, (as shown at $f'$, Fig. 6).

The outer or operating tire of the wheel, to which the thinner ends of the spring plates $e$ are connected, consists of hollow metal holders or shoes $h$ as many in number as the springs $e$ round the wheel, curved on their inner face so that when put together, end to end, (see Fig. 1) they form a complete ring, the ends of which are connected together flexibly, one end of each being formed in the shape of a hook turned either inward or outward, and the other end being formed with a similar corresponding hook turned in the opposite direction so that the two hooked parts can be engaged with each other (as shown at $i$, Fig. 3) the entire series forming an articulated ring or tire capable of slight but sufficient movement at the hooked joints $i$. Or the ends of the holders or shoes may be attached together in any other convenient manner. For instance, their ends may be arranged to overlap by projecting ends or lugs, fitting into each other so as to form hinged joints at $j$ as shown in Figs. 9, 10, 11, 12, 13, and 14, pins or bolts $k$ (Fig. 9) passing through the overlapping ends and connecting the ends of the two adjoining holders or shoes $h$.

The outer ends of the spring plates $e$ are formed with projections $l$ fitting into corresponding transverse recesses at $m$ in the center of the curved back of the metal shoe $h$, a pin or bolt $n$ being passed through holes in both, so that the end of the spring $e$ is attached sufficiently strongly to the back of the metal shoe $h$, but allowing the necessary amount of play. Or the outer ends of the spring plate $e$ may be attached to the shoes $h$ by any other convenient means.

As shown in Figs. 7 and 8, the ends of the adjoining holders $h$ may be connected together by links $s$ pivoted at $t$ to the sides of the holders, so that the latter are capable of a sufficient amount of independent movement.

In Figs. 9 and 10 the links $s$ are shown used in connection with the hinges $j$ and pivot bolts $k$, and their central parts are shown projecting up sufficiently to cover the ends of the pivots $k$ and preventing the latter from accidentally coming out. The holes for the links $s$ should be sufficiently elongated to allow slight turning movement of the holders $h$. The outer face of the metal shoe $h$ is hollow so that it forms a box or holder into which can be fitted and driven properly-shaped blocks $o$ of suitable wood the outer face or tread of which is curved and runs on the road. These blocks are secured against falling out by means of an angular longitudinal groove $p$ (see Fig. 4) formed in their back, in which fits a corresponding wedge $q$ (Figs. 3, 4, and 5), so that when the wooden block $o$ is forcibly driven into its place the wedge $q$ (the back of which abuts against the bottom of the recess in the metal shoe $h$ which holds the wood block $o$) forcibly separates the sides of the angular recess in the block into which it enters and holds the latter perfectly securely.

In Fig. 4 the sides of the holder $h$ are shown inclined slightly inward, the separated sides of the wood block $o$ being driven against them by the wedge $q$.

For light wheels such as bicycle wheels and the like, the holders or shoes $h$ may be made in the form of light metal frames having perforations at their sides ends, and bottom, the wooden blocks $o$ being retained in position by bolts or screws at $r$ (Fig. 12) suitably arranged in the frames, and instead of wooden blocks I may use other material such as cork alone or combined with other substance.

The improved tire possesses perfect elasticity and resiliency, and runs with very great smoothness, and it is durable and not liable to get out of order.

The details of construction may be varied more or less as may be found desirable.

What I claim as my invention and desire to secure by Letters Patent, is:—

1. Spring tires for the wheels of motor cars, cycles, carts, carriages, or other vehicles, consisting in the combination with a hub, spokes, and rim, of any of the usual kinds, of a metal hoop fitted and fixed round the rim, a number of projections round the outer circumference of the hoop, transverse inclined grooves on the lugs, a series of elastic steel springs, curved cycloidally in edge view, their inner ends being fitted and fixed in the transverse grooves, metal holders to the backs of which the outer ends of the spring plates are pivoted, and wooden blocks fitted tightly into and projecting beyond the outer edge of the metal holders, substantially as described and shown.

2. In spring tires for wheels, the combination of a metal hoop $b$ fixed upon the rim $a$ of an ordinary wheel, lugs $c$ on the hoop $b$, transverse inclined grooves $d$ in the lugs $c$, elastic steel curved springs $e$ fixed at their inner ends in the inclined grooves $d$, metal holders $h$ pivoted together at their ends, and wooden blocks $o$ fitted tightly into the metal holders $h$, substantially as set forth and shown.

3. In a spring tire, the combination with the wheel, of a plurality of lugs formed on said wheel, a tread portion surrounding said wheel and a plurality of curved springs pivotally connected at one end to said tread and rigidly connected at their other ends to said lugs on said wheel, substantially as described.

4. In a spring tire, the combination with the wheel, of a metallic encircling hoop arranged on the periphery thereof, a plurality of lugs formed on said hoop, a plurality of metallic shoes linked together surrounding said hoop and forming the tread portion, a series of curved springs pivotally connected at one end to the said metallic shoes and means for locking the other ends of said springs in said lugs on said hoop, substantially as described.

5. In a spring tire, the combination with the wheel, of a metallic encircling hoop arranged on the periphery thereof, a plurality of radially extending lugs formed on said hoop, said lugs being provided with transverse inclined grooves, metallic shoes in number corresponding to said lugs on said hoop, said shoes being curved slightly on their inner faces and having their ends connected flexibly together forming a complete ring surrounding said hoop, and a plurality of curved springs, the inner ends thereof fitting tightly in said grooves in said lugs and the other ends pivotally attached to said shoes, substantially as described.

6. In a spring tire, the combination with a wheel, of an encircling hoop arranged on the periphery thereof, a plurality of lugs formed on said hoop, said lugs being provided with curved inclined grooves, a tread portion formed of a plurality of flexibly connected metallic shoes surrounding said hoop, wooden blocks fitting securely into and extending out beyond the outer edge of said shoes, a plurality of cycloidally curved springs having their inner enlarged ends tightly secured in said curved inclined grooves and their outer ends pivotally attached to said metallic shoes and means for locking said springs in said grooves, substantially as described.

7. In a spring tire, the combination with the wheel, of an encircling hoop arranged on the periphery thereof, lugs formed on said hoop and provided with transverse inclined grooves and registering transverse bores, a tread portion surrounding said hoop, curved springs pivotally attached at their outer smaller end to the inner faces of said tread members, the other end of said spring tightly fitting into said recess, a pin fitting into said bore and into a corresponding recess in said springs thereby locking said springs in said grooves, substantially as described.

In witness whereof I have hereunto set my hand in the presence of two witnesses.

ARTHUR ROBERT HUBBARD.

Witnesses:
 ALEX. N. FAREWELL,
 ALFRED T. BRATTON.